United States Patent
Bhuyan

(10) Patent No.: US 11,625,398 B1
(45) Date of Patent: Apr. 11, 2023

(54) JOIN CARDINALITY ESTIMATION USING MACHINE LEARNING AND GRAPH KERNELS

(71) Applicant: Teradata US, Inc, Dayton, OH (US)

(72) Inventor: Dhiren Kumar Bhuyan, Hyderabad (IN)

(73) Assignee: Teradata US, Inc., San Diego, CA (US)

( * ) Notice: Subject to any disclaimer, the term of this patent is extended or adjusted under 35 U.S.C. 154(b) by 798 days.

(21) Appl. No.: 16/218,006

(22) Filed: Dec. 12, 2018

(51) Int. Cl.
*G06F 16/2453* (2019.01)
*G06F 16/901* (2019.01)
*G06F 17/16* (2006.01)
*G06N 20/10* (2019.01)

(52) U.S. Cl.
CPC .... *G06F 16/24544* (2019.01); *G06F 16/9027* (2019.01); *G06F 17/16* (2013.01); *G06N 20/10* (2019.01)

(58) Field of Classification Search
CPC .......... G06F 16/24544; G06F 16/9027; G06F 17/16; G06N 20/10
See application file for complete search history.

(56) References Cited

U.S. PATENT DOCUMENTS

| | | | |
|---|---|---|---|
| 8,655,867 B2 | 2/2014 | Collins | |
| 9,177,025 B2 | 11/2015 | Bensberg et al. | |
| 9,336,275 B2 | 5/2016 | Potapov | |
| 10,489,348 B2 | 11/2019 | Harding, Jr. et al. | |
| 10,642,832 B1 * | 5/2020 | Neumann | G06F 16/24535 |
| 2010/0082602 A1 * | 4/2010 | Ganapathi | G06F 16/24545 707/718 |
| 2015/0039538 A1 * | 2/2015 | Hefeeda | G06F 16/21 706/12 |

OTHER PUBLICATIONS

Gauzere, Benoit, Brun, Luc, Villemin, Didier, Graph kernels in chemoinformatics, Matthias Dehmerand Frank Emmert-Streib. Quantitative Graph Theory Mathematical Foundations and Applications, CRC Press, Sep. 18, 2015, pp. 1-51, HAL Id: hal-01201933, https://hal.archives-ouvertes.fr/hal-01201933.

Shervashidze, Nino, Schweitzer, Pascal, Van Leeuwen, Erik Jan, Mehlhorn, Kurt, Borgwardt, Karsten M., Weisfeiler-Lehman Graph Kernels, Journal of Machine Learning Research 12 (2011) 2539-2561, Published 9/11, pp. 2539-2561, Editor: Francis Bach.

Ramon, Jan and Gartner, Thomas, Expressivity versus Efficiency of Graph Kernels.

Shervashidze, Nino and Borwardt, Karsten, Fast subtree kernels on graphs.

* cited by examiner

*Primary Examiner* — Etienne P Leroux
*Assistant Examiner* — Husam Turki Samara
(74) *Attorney, Agent, or Firm* — Howard Speight

(57) ABSTRACT

A cardinality of a query is estimated by creating a join plan for the query. The join plan is converted to a graph representation. A subtree graph kernel matrix is generated for the graph representation of the join plan. The subtree graph kernel matrix is submitted to a trained model for cardinality prediction which produces a predicted cardinality of the query.

14 Claims, 10 Drawing Sheets

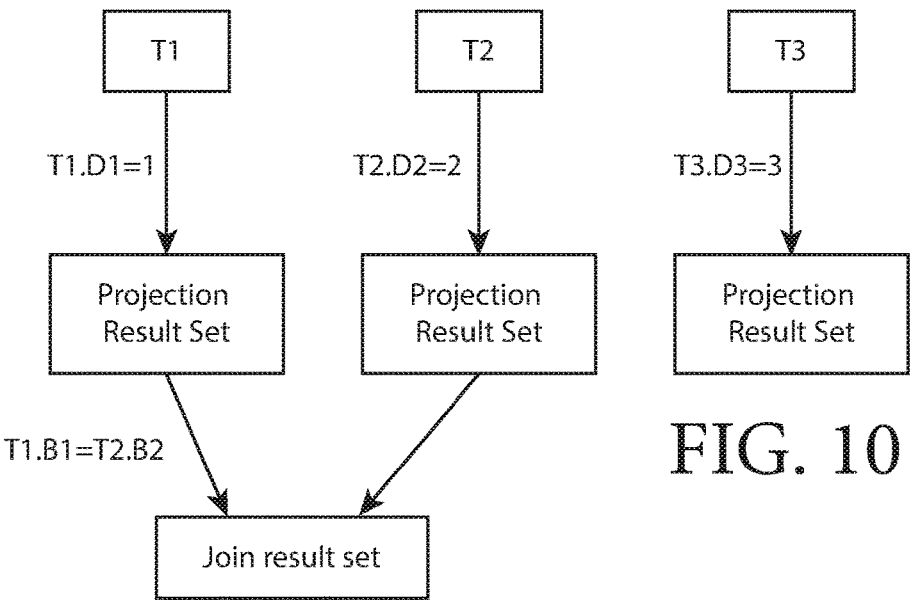
FIG. 10
FIG. 9
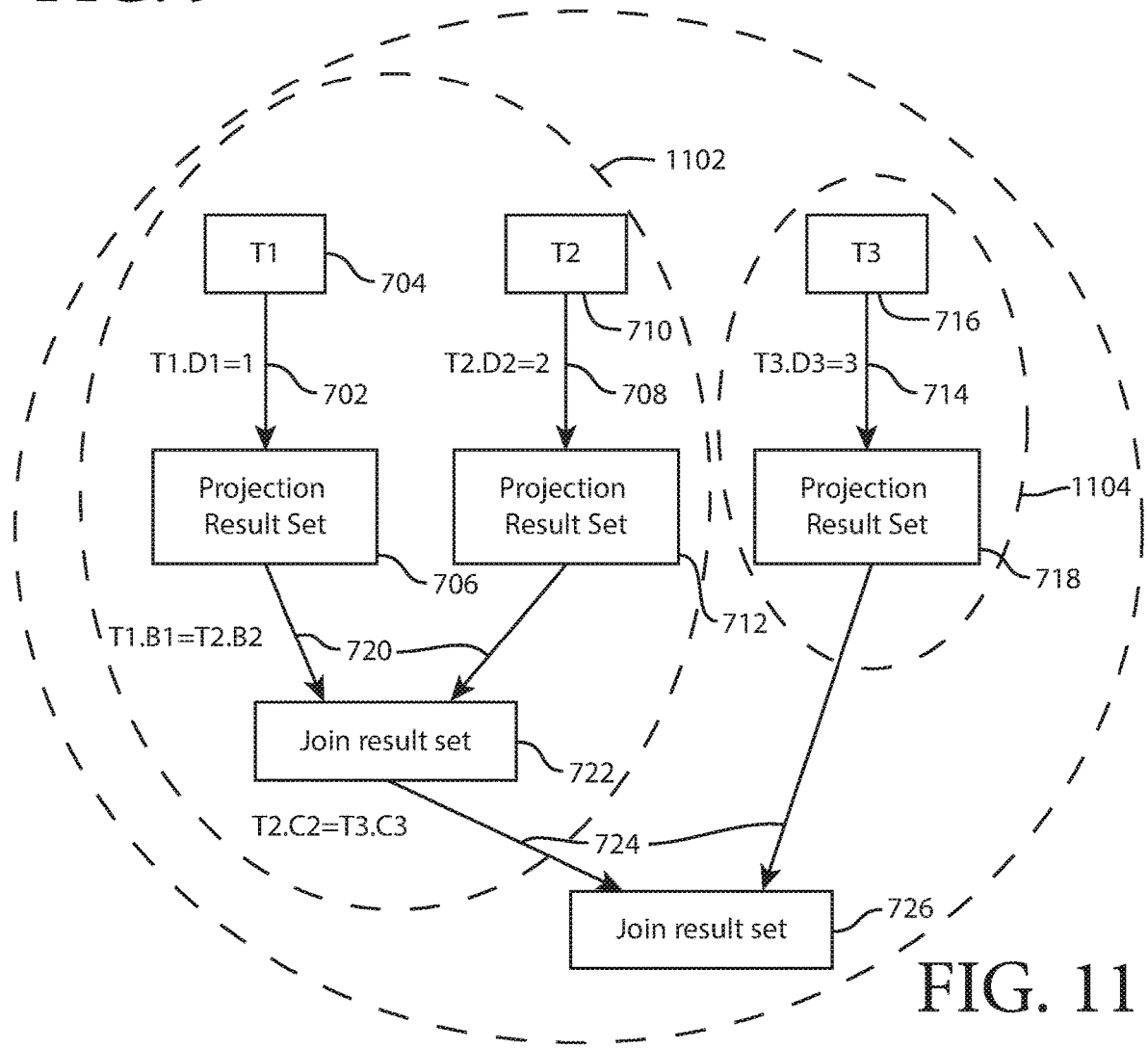
FIG. 11

JP - Join Predicate
RS - Result Set

JOIN CARDINALITY ESTIMATION USING MACHINE LEARNING AND GRAPH KERNELS

BACKGROUND

The task of cost-based database query optimizers is to produce the optimal execution plan (i.e., with lowest cost) among many possible plans. One basis on which costs of different plans are compared with each other is the cost which is derived from estimates of sizes (or "cardinalities") of the temporary or intermediate relations (or tables) after operations such as selections, joins and aggregations, etc. The estimates are typically derived from statistics. Inaccurate base table statistics or inaccurate derived estimates may cause the optimizer to choose suboptimal plans. Although the initial error may be negligible for the first operation such as single table selection or joins between base tables, subsequent errors can compound.

Query optimizers rely on assumptions underlying a mathematical model:
  Current State of Database—the optimizer typically assumes that statistics reflect the current state of database,
  Column Independence—in the absence of column correlation information, the optimizer typically assumes that columns are completely independent,
  Join Uniformity—the optimizer typically assumes that each value of the smaller domain has a match in the larger domain When these assumptions are not met, error may occur in the cardinality estimations leading to inaccurate costs, causing selection of suboptimal plans.

Further, when data distribution of a join column is heavily skewed, join cardinality estimation can be incorrect, resulting in poor quality query plans and degraded performance.

In addition, accumulating and maintaining useful up-to-date statistics can be complex and computationally intensive.

Therefore, a non-statistical method to estimate join cardinality would be useful.

BRIEF DESCRIPTION OF THE DRAWINGS

FIG. 9 is a representation of a join plan.
FIG. 10 is a representation of a join plan.
FIG. 11 is a copy of the join plan of FIG. 7 with markings showing similarities to the join plans of FIGS. 9 and 10.

DETAILED DESCRIPTION

The following detailed description illustrates embodiments of the present disclosure. These embodiments are described in sufficient detail to enable a person of ordinary skill in the art to practice these embodiments without undue experimentation. It should be understood, however, that the embodiments and examples described herein are given by way of illustration only, and not by way of limitation. Various substitutions, modifications, additions, and rearrangements may be made that remain potential applications of the disclosed techniques. Therefore, the description that follows is not to be taken as limiting on the scope of the appended claims. In particular, an element associated with a particular embodiment should not be limited to association with that particular embodiment but should be assumed to be capable of association with any embodiment discussed herein.

Conventional methods that use machine learning technique for join cardinality estimation create a query feature vector from the Structured Query Language (SQL) query text by collecting features like tables, columns, single table predicates, join predicates, group-by clauses, etc. Then the feature vector is input to a machine learning model like a Support Vector Machine (SVM), a K Nearest Neighbors (KNN) machine or a Decision Tree. Such techniques rely on the machine learning algorithm to find any correlations and/or patterns in the data. They typically work on a fixed set of features, so it may be difficult to identify which features to consider. They do not have much control over what features are impacting the prediction more. These techniques do not take advantage of the structural similarities that exist in hierarchical data like in this case, join plan trees. Between two join plan trees, it can happen that join plan of one query is a sub tree in another query's join plan tree.

This disclosure describes a graph-based representation instead of feature vectors to overcome the above limitations.

Figure 1:
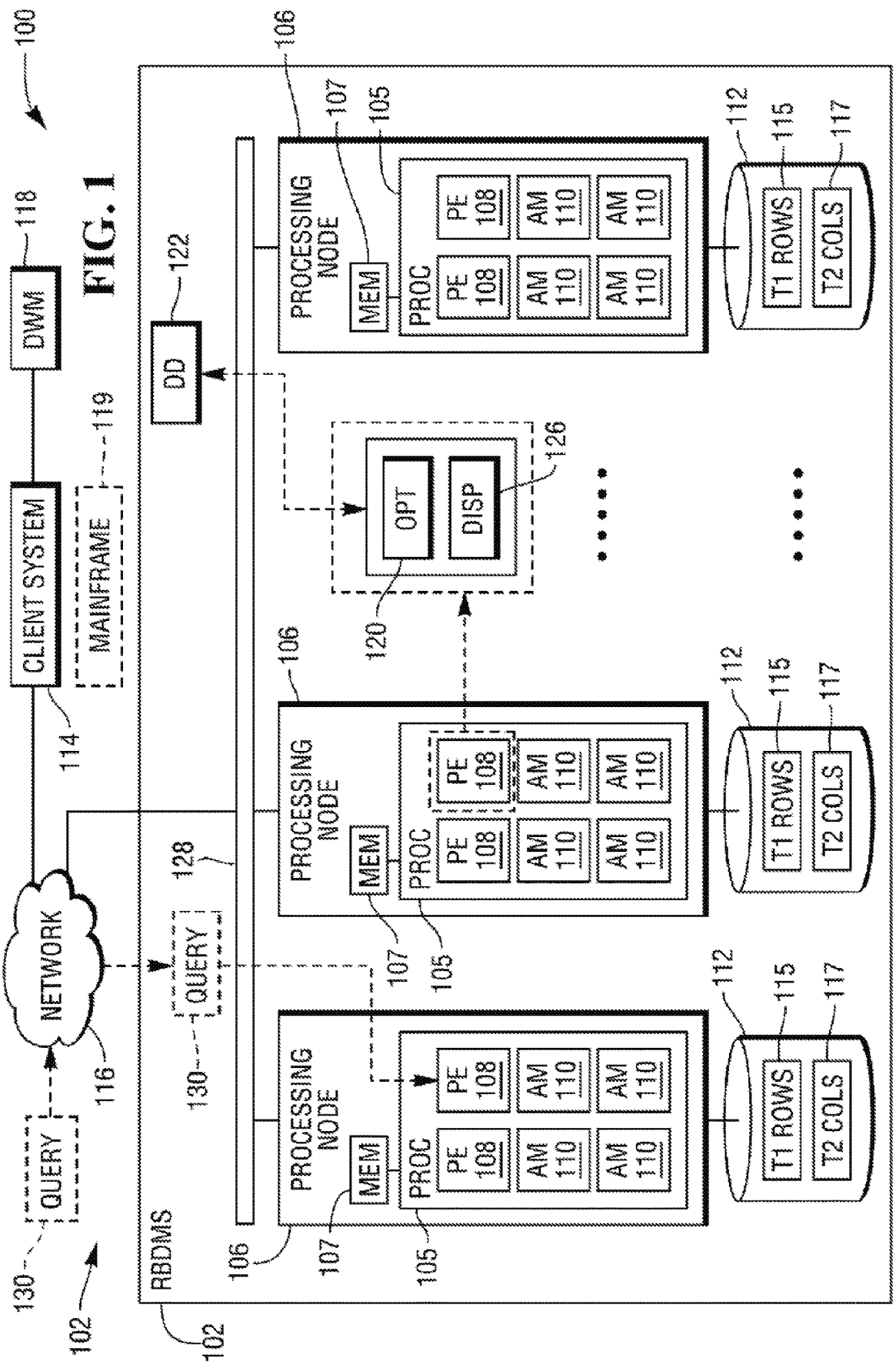
FIG. 1 is a block diagram of an example distributed relational database system.

FIG. 1 is a diagrammatic representation of an example architecture for a database system 100, such as a Teradata Active Data Warehousing System®. In one example, the database system 100 includes a relational database management system (RDBMS) 102 that implements a parallel-processing environment to carry out database management. The RDBMS 102 may be a combination of software (e.g., computer program routines, subroutines, applications, etc.) and hardware (e.g., processors, memory, etc.). In the example of FIG. 1, the RBDMS 102 may be a massive parallel processing (MPP) system having an array of processing units and distributed memory. In alternative examples, the RBDMS 102 may implement a single processing unit, such as in a symmetric multiprocessing (SMP) system configuration. The RBDMS 102 may include one or more processing units used to manage the storage, retrieval, and manipulation of data in data storage facilities (DSFs) 112. The array of processing units may include an array of processing nodes 106 that manage the storage, retrieval, and manipulation of data included in a database.

In one example, each processing node 106 may include one or more physical processors 105 and memory 107. The memory 107 may include one or more memories and may be computer-readable storage media or memories, such as a cache, buffer, RAM, removable media, hard drive, flash drive, or other computer-readable storage media. Computer-readable storage media may include various types of volatile and nonvolatile storage media. Various processing techniques may be implemented by the processors 105 such as multiprocessing, multitasking, parallel processing and the like, for example.

The processing nodes 106 may include one or more other processing units such as parsing engine (PE) modules 108 and access modules (AM) 110. As described herein, "modules" are defined to include software, hardware or some combination thereof executable by one or more physical and/or virtual processors. Software modules may include instructions stored in the one or more memories that are executable by one or more processors. Hardware modules may include various devices, components, circuits, gates, circuit boards, and the like that are executable, directed, and/or controlled for performance by one or more processors. The access modules 110 may be access module processors (AMPS), such as those implemented in the Teradata Active Data Warehousing System®.

The parsing engine modules 108 and the access modules 110 may each be virtual processors (vprocs) and/or physical processors. In the case of virtual processors, the parsing engine modules 108 and access modules 110 may be executed by one or more physical processors, such as those that may be included in the processing nodes 106. For example, in FIG. 1, each parsing engine module 108 and access module 110 is associated with a respective processing node 106 and may each be executed as one or more virtual processors by physical processors 107 included in the respective processing node 106.

In FIG. 1, each processing node 106 is shown as including multiple parsing engine modules 108 and access modules 110, such that there are more parsing engine modules 108 and access modules 110 than processing nodes 106. In one example, during operation, the one or more physical processors 105 included in the processing nodes 106 may execute the parsing engine modules 108 and access modules 110 by switching between the executions of the various modules at a rapid rate allowing the vprocs to substantially operate in "parallel."

Figure 2:
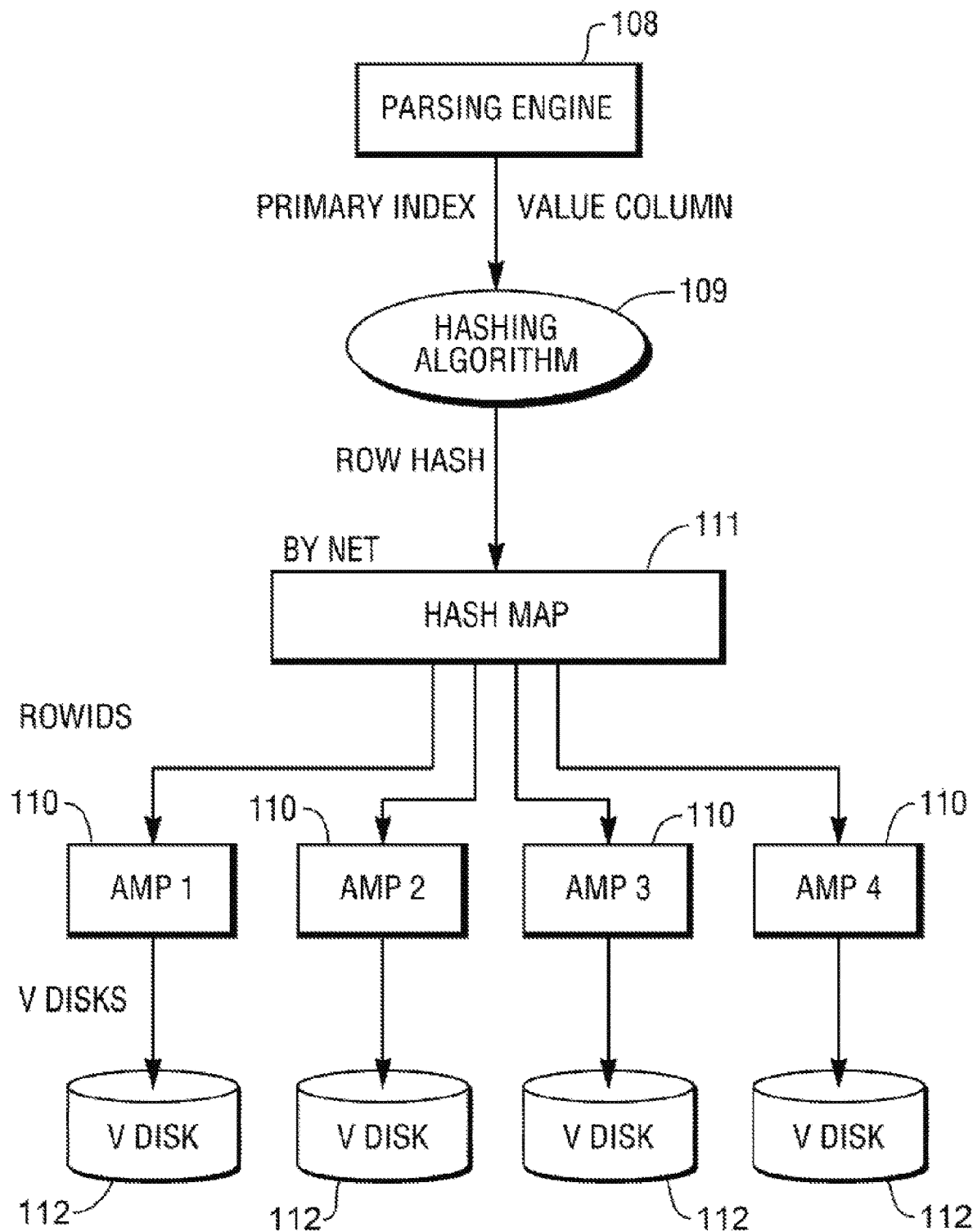
FIG. 2 illustrates a hashing process for distributing records in a table across database modules.

The RBDMS 102 stores data in one or more tables in the DSFs 112. In one example, the database system 100 may be configured to distribute rows across access modules 110 and their associated DSFs 112 in accordance with their primary index. The primary index distributes the records in a table across the AMPs, by hashing the columns that make up the primary index to determine which records go to which AMP. FIG. 2 provides an illustration of this hashing process. A hashing algorithm 109 produces hash values from the values in the columns specified by the primary index. Some portion, possibly the entirety, of the hash value is designated a "hash bucket." The hash buckets are assigned to DSFs 112 and associated access modules 110 by a hash bucket map 111. The characteristics of the columns chosen for the primary index determine how evenly the rows are distributed.

For an access module 110, rows of each stored table may be stored across multiple DSFs 112, such as rows 115 to table T1 and columns 117 of table T2. The rows may be partitioned by row and/or column. Partitioning by rows is determined by one or more user-specified partitioning expressions. Partitioning by column is determined by user-specified grouping of one or more columns into each column partition. Each parsing engine module 108 may organize the storage of data and the distribution of table rows and columns. The parsing engine modules 108 may also coordinate the retrieval of data from the DSFs 112 in response to queries received, such as those received from a client computer system 114 connected to the RBDMS 102 through connection with a network 116. The network 116 may be wired, wireless, or some combination thereof. The network 116 may be a virtual private network, web-based, directly-connected, or some other suitable network configuration. In one example, the client computer system 114 may run a dynamic workload manager (DWM) client 118. Alternatively, the database system 100 may include a mainframe 119 used to interact with the RBDMS 102.

Each parsing engine module 108, upon receiving an incoming database query, such as the query 130, may apply an optimizer module 120 to assess the best plan for execution of the query. An example of an optimizer module 120 is shown in FIG. 1 with regard to parsing engine module 108. Additional description of the parsing engine modules 108 is provided with regard to FIGS. 3 and 4. Selecting the optimal query-execution plan may include, among other things, identifying which of the processing nodes 106 are involved in executing the query and which database tables are involved in the query, as well as choosing which data-manipulation techniques will serve best in satisfying the conditions of the query. To this end, for each parsing engine module 108, a parser module 302 (see FIG. 3), and/or optimizer module 120 may access a data dictionary module 122, shown in FIG. 1 specifically for parsing engine module 108 for purposes of illustration.

The data dictionary module 122 may specify the organization, contents, and conventions of one or more databases, such as the names and descriptions of various tables maintained by the RBDMS 102 as well as fields of each database, for example. Further, the data dictionary module 122 may specify the type, length, and/or other various characteristics of the stored tables. The RBDMS 102 typically receives queries in a standard format, such as the structured query language (SQL) put forth by the American National Standards Institute (ANSI). However, other formats, such as contextual query language (CQL), data mining extensions (DMX), and multidimensional expressions (MDX), for example, may be implemented in the database system 100 separately or in conjunction with SQL. The data dictionary 122 may be stored in the DSFs 112 or some other storage device and selectively accessed.

An interconnection 128 allows communication to occur within and between each processing node 106. For example, implementation of the interconnection 128 provides media within and between each processing node 106 allowing communication among the various processing units. Such communication among the processing units may include communication between parsing engine modules 108 associated with the same or different processing nodes 106, as well as communication between the parsing engine modules 108 and the access modules 110 associated with the same or different processing nodes 106. Through the interconnection 128, the access modules 110 may also communicate with one another within the same associated processing node 106 or other processing nodes 106.

The interconnection 128 may be hardware, software, or some combination thereof. In instances of at least a partial-hardware implementation the interconnection 128, the hardware may exist separately from any hardware (e.g., processors, memory, physical wires, etc.) included in the processing nodes 106 or may use hardware common to the processing nodes 106. In instances of at least a partial-software implementation of the interconnection 128, the software may be stored and executed on one or more of the memories 107 and processors 105 of the processor nodes 106 or may be stored and executed on separate memories and processors that are in communication with the processor nodes 106. In one example, interconnection 128 may include multi-channel media such that if one channel ceases to properly function, another channel may be used. Additionally, or alternatively, more than one channel may also allow distributed communication to reduce the possibility of an undesired level of communication congestion among processing nodes 106.

Figure 3:
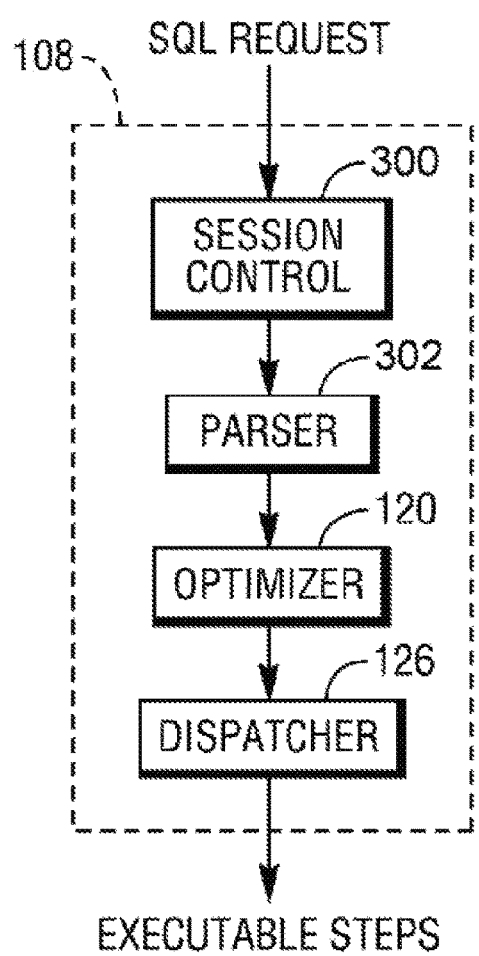
FIG. 3 is a block diagram of a portion of the example database system of FIG. 1.

In one example system, each parsing engine module 108 includes four primary components: a session control module 300, a parser module 302, the optimizer module 120, and a dispatcher module 126 as shown in FIG. 3. The session control module 300 provides the logon and logoff functions. It accepts a request for authorization to access the database, verifies it, and then either allows or disallows the access. Once the session control module 300 allows a session to begin, an SQL request may be received such as through submission by a user and the SQL request is routed to the parser module 302.

Figure 4:
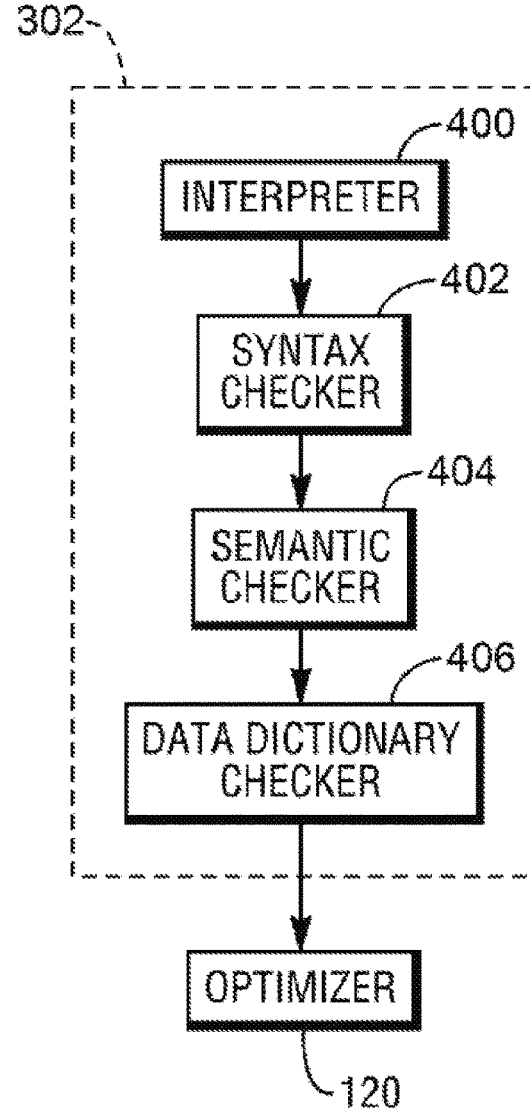
FIG. 4 is a block diagram of another portion of the example database system of FIG. 1.

As illustrated in FIG. 4, the parser module 302 may include an interpreter module 400 that interprets the SQL request. The parser module 302 may also include a syntax checker module 402 that checks the request for correct SQL syntax, as well as a semantic checker module 304 that evaluates the request semantically. The parser module 302 may additionally include a data dictionary checker 406 to ensure that all of the objects specified in the SQL request exist and that the user has the authority to perform the request. The parsing engine module 108 implements the optimizer module 120 to select the least expensive plan to perform the request, and the dispatcher 126 coordinates the runtime execution of executable steps of the query execution plan of the optimizer module 120 with the access modules 110.

Figure 5:
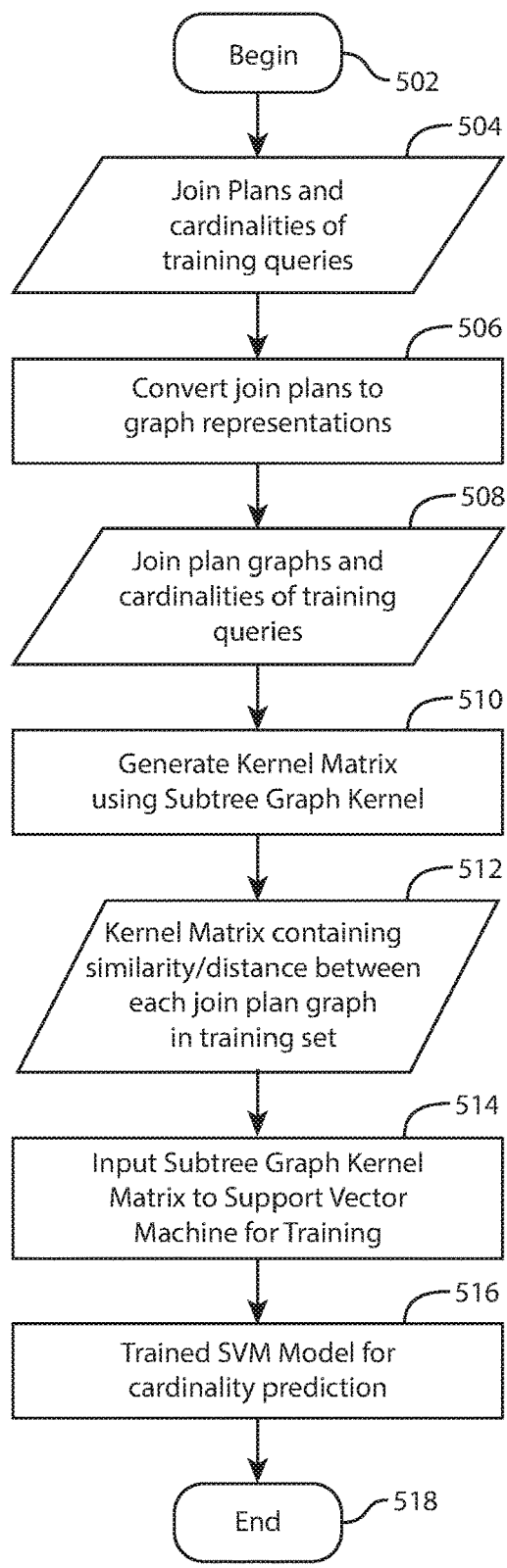
FIG. 5 is a flow chart illustrating a process for creating a trained model for cardinality estimation from already executed join plans and their cardinalities.
Figure 6:
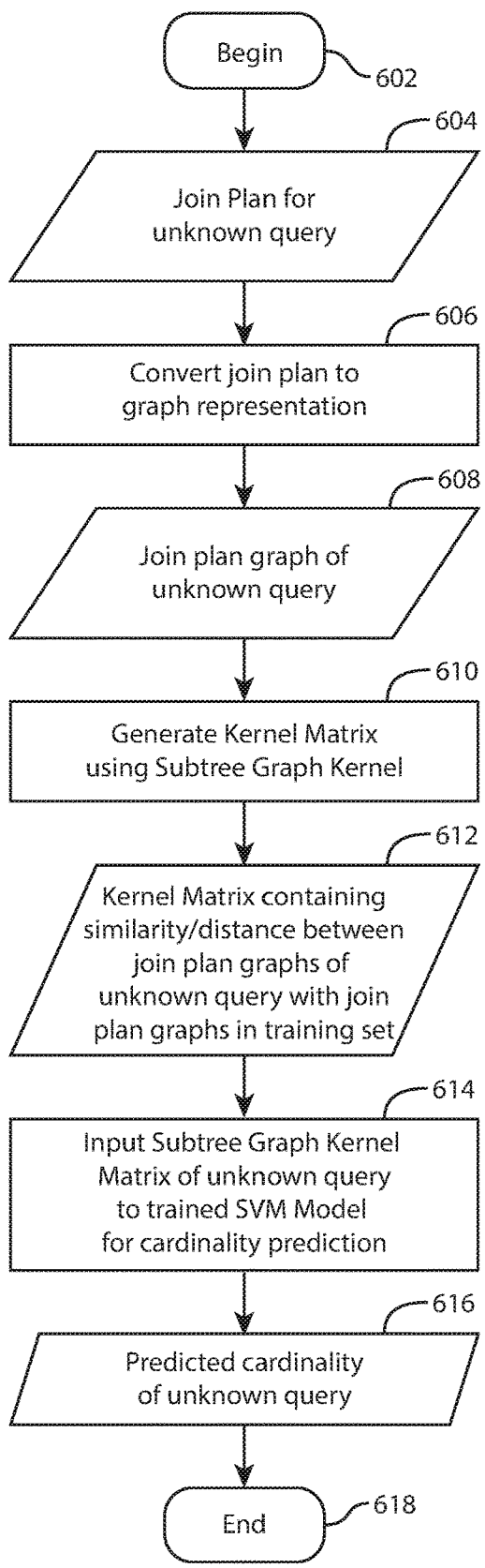
FIG. 6 is a flow chart illustrating a process of predicting cardinality for an unknown query.

In FIGS. 5 and 6, discussed below, the rectangular boxes represent processes and the boxes with slanted sides represent input or output.

A process for creating a trained model for cardinality estimation from already executed join plans and their cardinalities, illustrated in FIG. 5, begins (block 502) with receipt of join plans and cardinalities for training queries (block 504). A join plan is a step-by-step plan for performing a query's joins. The cardinality of a join plan is the number of rows, or equivalents, that is produced by the RDBMS 102 executing the query represented by a respective join plan. The training queries may be actual queries that have been executed by the RDBMS 102 or they may be random queries that are generated for the purpose of creating the trained model.

If only one table is referenced in a query, no join is required and thus no join order is required. If only two tables are referenced in the query, there is only one join to be performed, and the optimizer 120 performs a binary join. If more than two tables are referenced in a query, the optimizer 120 reduces those joins to a series of binary joins (i.e., joins between two tables) and then attempts to determine the most cost-effective join order.

For example, consider the following multi-table request:
SELECT * FROM T1, T2, T3 WHERE T1.B1=T2.B2 AND T2.C2=T3.C3 AND T1.D1=1 AND T2.D2=2 AND T3.D3=3.

Figure 7:
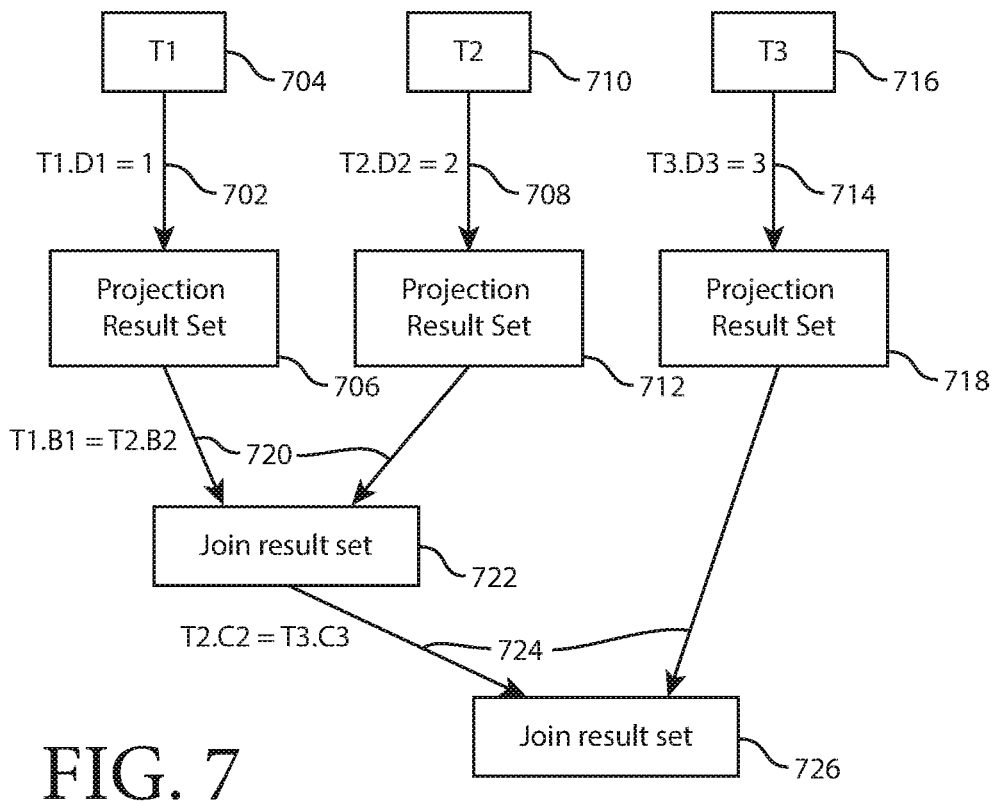
FIG. 7 is a representation of a join plan.
Figure 8:
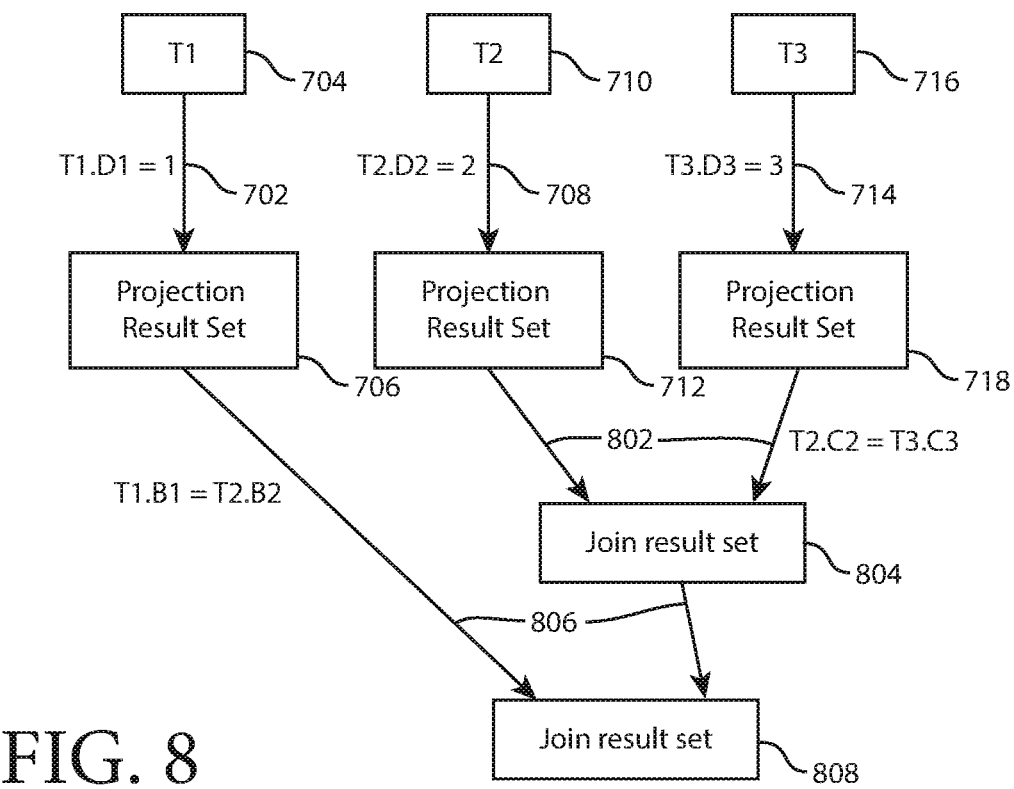
FIG. 8 is a representation of a join plan.

The optimizer 120, upon receipt of such a request, may generate join plans like those in FIGS. 7 and 8. In FIGS. 7 and 8, the boxes represent base tables or result sets and the arrows represent retrieve conditions or join conditions.

In the join plan shown in FIG. 7, the retrieve condition 702 (i.e., "T1.D1=1") from base table T1 704 produces the projection result set 706 that is the set of rows from base table T1 704 that satisfies the retrieve condition 702. The retrieve condition 708 (i.e., "T2.D2=2") from base table T2 710 produces the projection result set 712 that is the set of rows from base table T2 710 that satisfies the retrieve condition 708. The retrieve condition 714 (i.e., "T3.D3=3") from base table T3 716 produces the projection result set 718 that is the set of rows from base table T3 716 that satisfies the retrieve condition 714.

The join condition 720 (i.e., "T1.B1=T2.B2") produces the join result set 722 that is the set of rows from projection result set 706 and projection result set 712 that satisfies the join condition 720. The join condition 724 (i.e., "T2.C2=T3.C3") produces the join result set 726 that is the set of row from the join result set 722 and the projection result set 718 that satisfies the join condition 724.

Thus, in the join plan graph in FIG. 7, the optimizer 120 has chosen to perform the T1.B1=T2.B2 join first and the T2.C2=T3.C3 join second. The order of joins is reversed in FIG. 8.

In the join plan shown in FIG. 8, as in FIG. 7, the retrieve condition 702 (i.e., "T1.D1=1") from base table T1 704 produces the projection result set 706 that is the set of rows from base table T1 704 that satisfies the retrieve condition 702. The retrieve condition 708 (i.e., "T2.D2=2") from base table T2 710 produces the projection result set 712 that is the set of rows from base table T2 710 that satisfies the retrieve condition 708. The retrieve condition 714 (i.e., "T3.D3=3") from base table T3 716 produces the projection result set 718 that is the set of rows from base table T3 716 that satisfies the retrieve condition 714.

In contrast to the join plan graph shown in FIG. 7, in the join plan graph shown in FIG. 8 the T2.C2=T3.C3 join is performed first and the T1.B1=T2.B2 join is performed second. The join condition 802 (i.e., "T2.C2=T3.C3") produces the join result set 804 that is the set of rows from projection result set 712 and projection result set 718 that satisfies the join condition 802. The join condition 806 (i.e., "T1.B1=T2.B2") produces the join result set 808 that is the set of row from the join result set 804 and the projection result set 706 that satisfies the join condition 806.

The optimizer 120 chooses the least costly join plan from the candidate set, i.e., between the join plan illustrated in FIG. 7 and the join plan illustrated in FIG. 8. The optimizer 120 may use column statistics to estimate the cardinality of each join, which is one of the bases for estimating cost.

The structure of join plans can be visualized as trees. The join plan of one query can be a subtree of another query's join plan. In that case, the cardinality of the former query can be useful for predicting the cardinality of the latter query. This structural similarity may be beneficial when predicting the cardinality of a complex join.

For example, assume that it is desired to predict cardinality of the multi-table query discussed above and that the optimizer 120 is considering the join plan illustrated in FIG. 7.

Assume also that the training set contains join plan and cardinality of the following set of queries.

SELECT * FROM T1, T2 WHERE T1.B1=T2.B2 AND T1.D1=1 AND T2.D2=2;

SELECT * FROM T3 WHERE T3.D3=3;

Assume also that the optimizer 120 chose join plans shown in FIGS. 9 and 10 for the above two queries. The similarities between the join plan shown in FIG. 9 and the portion of the join plan illustrated in FIG. 11 (which is a copy of the join plan shown in FIG. 7) enclosed by dashed line 1102 and between the join plan shown in FIG. 10 and the portion of the join plan illustrated in FIG. 11 enclosed by dashed line 1104 indicates the viability of using the known cardinalities of the join plans shown in FIGS. 9 and 10 to predict the cardinality of the join plan illustrated in FIG. 11.

Therefore, part of the problem of predicting the cardinality of an unknown query is identifying join plans for which cardinality is known that are similar to join plans within the unknown query.

Many problems in artificial intelligence, data mining, and machine learning involve variable-size structured data, such as strings and sequences, trees, and directed or undirected graphs. These data are to be contrasted with the standard, fixed-length, vectorial data also found in many applications. Join plans are one example of such variable-size structured data.

Kernel methods have emerged as an important class of machine learning methods suitable for variable-size structured data. Given two input objects u and v, such as two join plans, the basic idea behind kernel methods is to construct a kernel, k(u, v), which measures the similarity between u and v. one such kernel is an inner product of the form k(u, v)=<φ(u), φ(v)> in an embedding feature space determined by the map φ, which need not be given explicitly. Regression, classification, and other tasks can then be tackled using linear (convex) methods based solely on inner products computed via the kernel in the embedding space, rather than the original input space.

Subtree kernel is one of the graph kernel methods which compares two graphs G and G' by comparing all matchings between neighbors of two nodes, v from G and v' from G'. In other words, for all pairs of nodes v from G and v' from G', a subtree kernel counts all pairs of matching substructures in subtree patterns rooted at v and v'.

If join plans can be represented as graphs, then subtree kernels can be applied to them to find similarities. Machine learning models which work on kernels such as Support Vector Regression can then be used to build a trained model.

Figure 12:
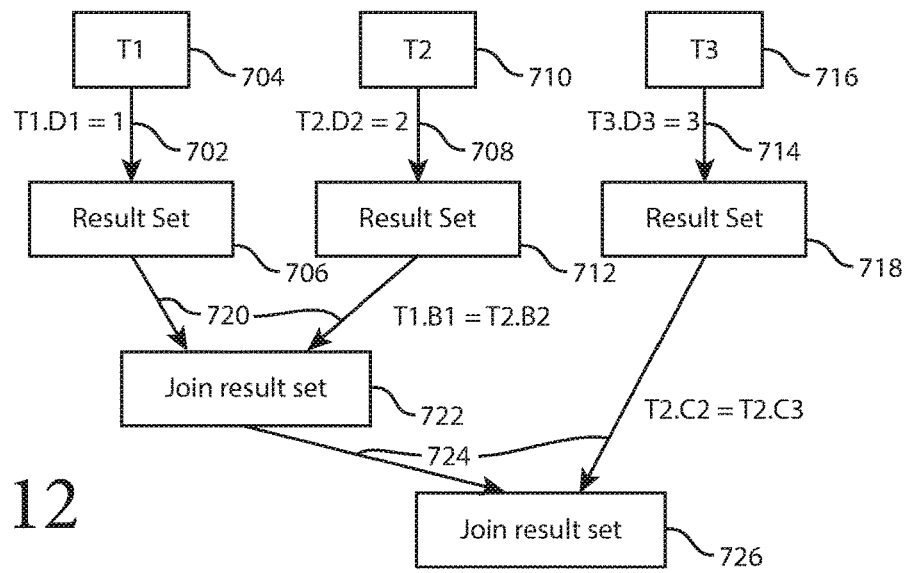
FIG. 12 is a copy of the join plan of FIG. 7.
Figure 13:
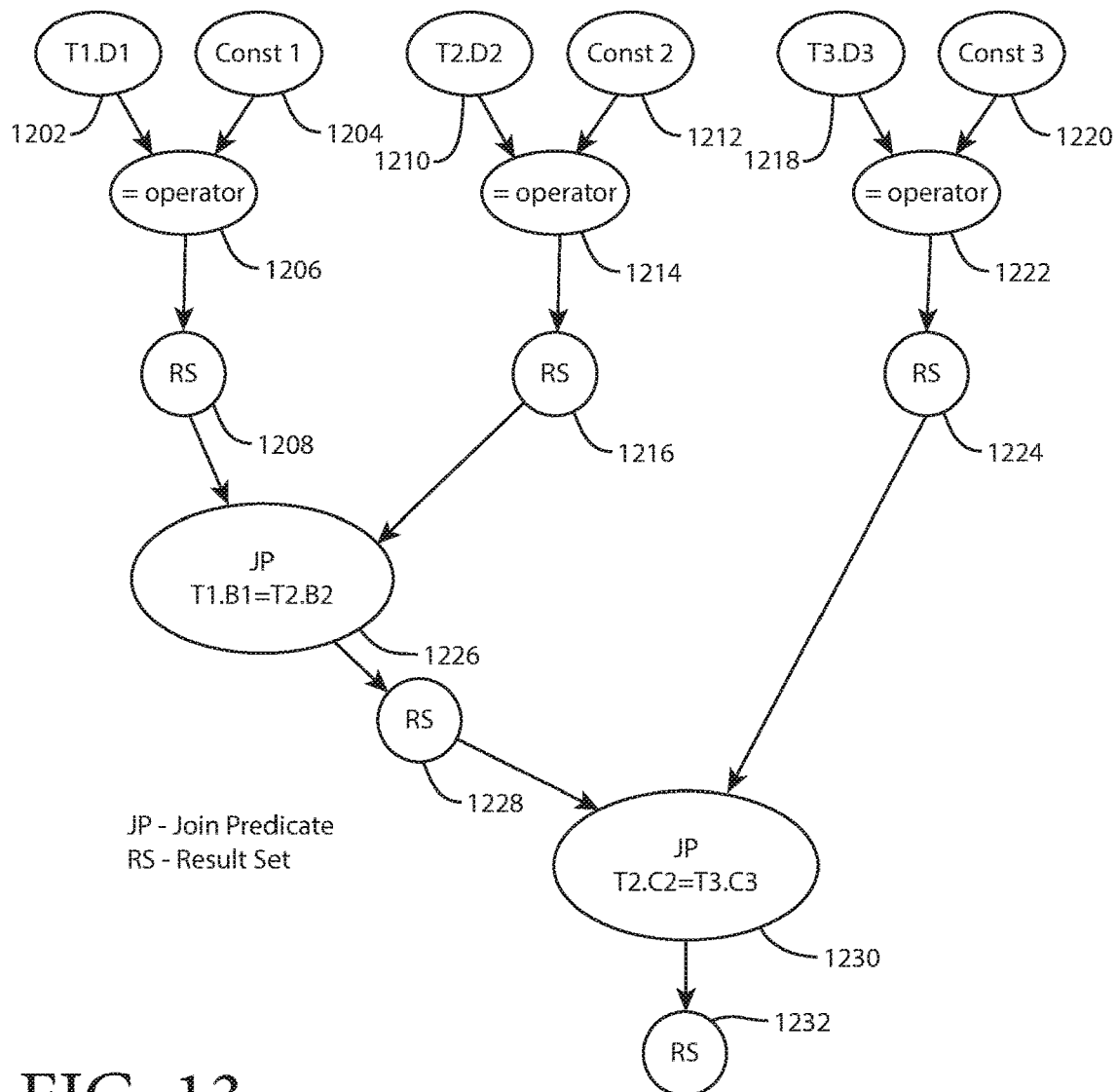
FIG. 13 is an example of a graph representation of the join plan of FIG. 12.

A process for representing a join plan as a graph is illustrated in FIGS. 12 and 13. Single table predicates and join predicates play a role in cardinality estimation. Therefore, the graph representation of a join plan may include these predicates as vertices.

FIG. 12 illustrates the same join plan and has the same structure and numbering as FIG. 7. FIG. 13 is an example of a graph representation of the join plan of FIG. 12. In FIGS. 13-17, ellipses represent vertices, with their labels indicating whether they are data or operators, and the arrows represent the flow of data.

In FIG. 12, vertex 1202, which corresponds to T1.D1 (the D1 column of the T1 table), and vertex 1204, which corresponds to the constant "1", are inputs to vertex 1206, which is the "equals" operator, producing an output (the rows in which T1.D1=1) which is stored in a result set 1208. Vertex 1210, which corresponds to T2.D2 (the D2 column of the T2 table), and vertex 1212, which corresponds to the constant "2", are inputs to vertex 1214, which is the "equals" operator, producing an output (the rows in which T2.D2=2) which is stored in a result set 1216. Vertex 1218, which corresponds to T3.D3 (the D3 column of the T3 table), and vertex 1220, which corresponds to the constant "3", are inputs to vertex 1222, which is the "equals" operator, producing an output (the rows in which T3.D3=3) which is stored in a result set 1224.

The result set 1208 and the result set 1216 are inputs to a join predicate (T1.B1=T2.B2) 1226 producing an output (the rows in which T1.B1=T2.B2) which is stored in result set 1228. The result set 1228 and the result set 1224 are inputs to a join predicate (T2.C2=T3.C3) 1230 producing an output (the rows in which T2.C2=T3.C3), which is stored in a result set 1232.

Examples of subtree graphs from the graph of FIG. 13 are shown in FIGS. 14-17. As can be seen it is possible to construct a greater number of subtree graphs than are shown in FIGS. 14-17.

Figures 14, 15, 16:
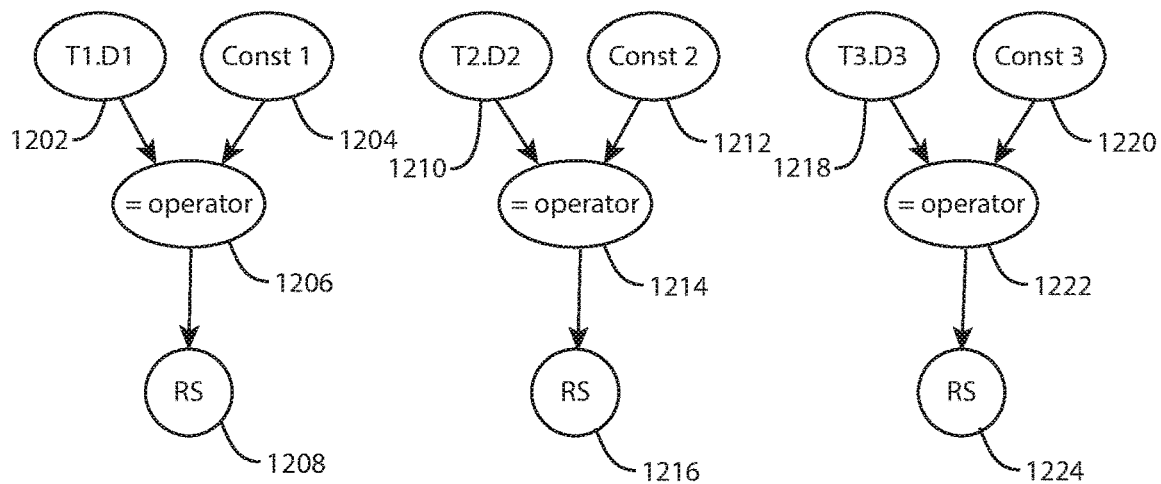
FIG. 14 is a representation of a subtree graph.
FIG. 15 is a representation of a subtree graph.
FIG. 16 is a representation of a subtree graph.
Figure 17:
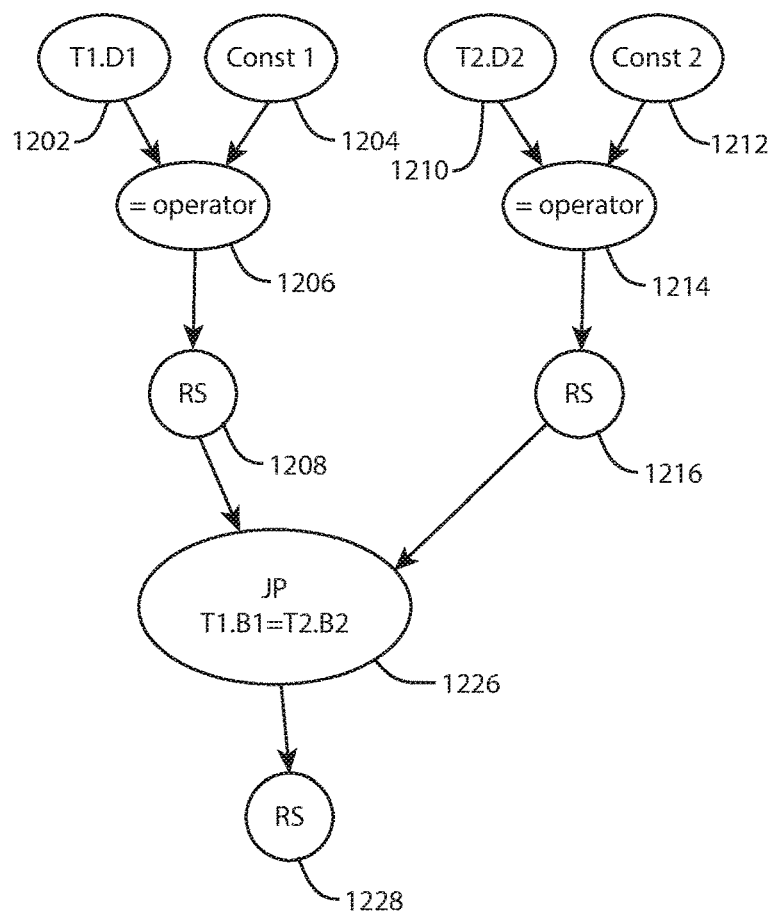
FIG. 17 is a representation of a subtree graph.

While the structure of the graphs may be similar, such as the graphs illustrated in FIGS. 14-16, the technique includes a way to distinguish the graphs from one another.

For example, each vertex and each edge (or arrow) in the graphs has a label, which provide a way to distinguish between similar graphs.

Figures 18, 19:
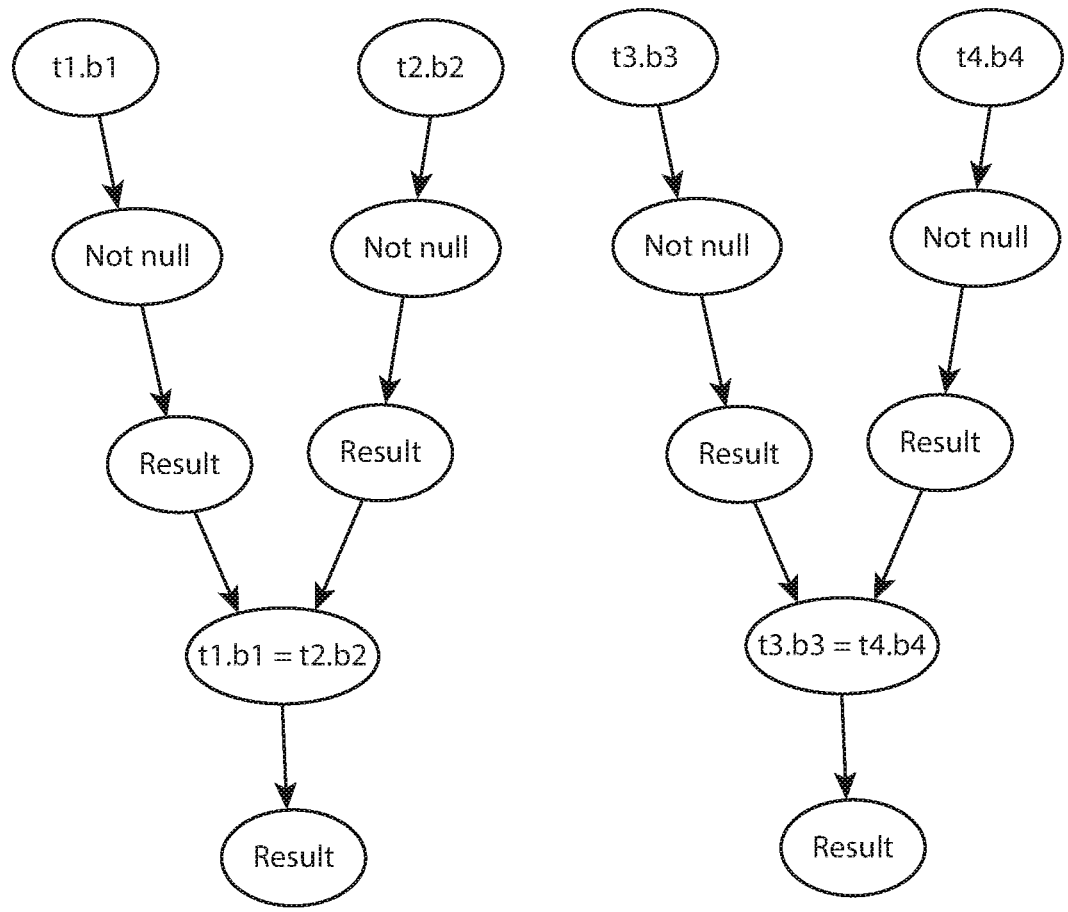
FIG. 18 is a join plan graph for a query.
FIG. 19 is a join plan graph for a query.

Consider the following two queries:

Query-1: select a1, a2 from t1, t2 where b1=b2;

Query-2: select a3, a4 from t3, t4 where b3=b4;

Join plan graphs for the two queries are illustrated in FIGS. 18 and 19, respectively. As can be seen, the join plan structure for both queries is the same. In one or more embodiments, each node is uniquely identified by a hash of the attributes of the node.

For example, the GraphML, which is an XML-like representation of a graph structure, for Query-1 may be:

<?xml version="1.0" encoding="UTF-8"?>
<graphml xmlns="http://graphml.graphdrawing.org/xmlns"
  xmlns:xsi="http://www.w3.org/2001/XMLSchema-instance"
  xsi:schemaLocation="http://graphml.graphdrawing.org/xmlns
  http://graphml.graphdrawing.org/xmlns/1.0/graphml.xsd">
<key id="v_strlabel" for="node" attr.name="strlabel" attr.type="double"/>
<graph id="G" edgedefault="directed">
  <node id="n0">
    <data key="v_strlabel">39847</data><!--Label is Hash(t1.b1)-->
  </node>
  <node id="n1">
    <data key="v_strlabel">16155</data><!--Label is Hash(Not Null operator)-->
  </node>
  <node id="n2">
    <data key="v_strlabel">76492</data><!--Label is Hash(Hash(n0)+Hash(n1))
      to uniquely identify this node as the retrieval of t1.b1 Not Null Operation-->
  </node>
  <node id="n3">
    <data key="v_strlabel">77539</data><!--Label is Hash(n2)+Hash(n6)+Hash(=)
      to uniquely identify this node as the join condition of t1.b1=t2.b2-->
  </node>
  <node id="n4">

```xml
            <data key="v_strlabel">13540</data><!--Label is
                Hash(t2.b2)-->
        </node>
        <node id="n5">
            <data key="v_strlabel">16155</data><!--Label is
                Hash(Not Null Operator-->
        </node>
        <node id="n6">
            <data key="v_strlabel">76492</data><!--Label
                is Hash(Hash(n4)+Hash(n5))
                to uniquely identify this node as the retrieval of
                t2.b2 Not Null Operation-->
        </node>
        <node id="n7">
            <data key="v_strlabel">76492</data><!--Label
                is Hash(Hash(n6))
                to uniquely identify this node as the join result
                of t1.b1=t2.b2 join-->
        </node>
        <edge source="n0" target="n1">
        </edge>
        <edge source="n1" target="n2">
        </edge>
        <edge source="n2" target="n3">
        </edge>
        <edge source="n4" target="n5">
        </edge>
        <edge source="n5" target="n6">
        </edge>
        <edge source="n6" target="n3">
        </edge>
        <edge source="n3" target="n7">
        </edge>
    </graph>
</graphml>
```

In contrast, the GraphML for Query-2 may be:

```xml
<?xml version="1.0" encoding="UTF-8"?>
<graphml xmlns="http://graphml.graphdrawing.org/xmlns"
    xmlns:xsi="http://www.w3.org/2001/XMLSchema-instance"
    xsi:schemaLocation="http://graphml.graphdrawing.org/xmlns
        http://graphml.graphdrawing.org/xmlns/1.0/
        graphml.xsd">
    <!--Created by igraph-->
    <key id="v_strlabel" for="node" attr.name="strlabel"
        attr.type="double"/>
    <graph id="G" edgedefault="directed">
        <node id="n0">
            <data key="v_strlabel">84183</data><!--Label is
                Hash(t3.b3)-->
        </node>
        <node id="n1">
            <data key="v_strlabel">16155</data><!--Label is
                Hash(Not Null operator)-->
        </node>
        <node id="n2">
            <data key="v_strlabel">76492</data><!--Label is
                Hash(Hash(n0)+Hash(n1))
                to uniquely identify this node as the retrieval of
                t3.b3 Not Null Operation-->
        </node>
        <node id="n3">
            <data key="v_strlabel">77539</data><!--Label is
                Hash(n2)+Hash(n6)+Hash(=)
                to uniquely identify this node as the join condition
                of t3.b3=t4.b4-->
        </node>
        <node id="n4">
            <data key="v_strlabel">13428</data><!--Label is
                Hash(t4.b4)-->
        </node>
        <node id="n5">
            <data key="v_strlabel">16155</data><!--Label is
                Hash(Not Null Operator-->
        </node>
        <node id="n6">
            <data key="v_strlabel">76492</data><!--Label is
                Hash(Hash(n4)+Hash(n5))
                to uniquely identify this node as the retrieval of
                t4.b4 Not Null Operation-->
        </node>
        <node id="n7">
            <data key="v_strlabel">76492</data><!--Label is
                Hash(Hash(n6))
                to uniquely identify this node as the join result of
                t3.b3=t4.b4 join-->
        </node>
        <edge source="n0" target="n1">
        </edge>
        <edge source="n1" target="n2">
        </edge>
        <edge source="n2" target="n3">
        </edge>
        <edge source="n4" target="n5">
        </edge>
        <edge source="n5" target="n6">
        </edge>
        <edge source="n6" target="n3">
        </edge>
        <edge source="n3" target="n7">
        </edge>
    </graph>
</graphml>
```

As can be seen, the similar looking queries are distinguishable as different graphs due to the hashing of all the features of each node.

Returning to FIG. 5, the process for creating a trained model for cardinality estimation from already executed join plans and their cardinalities continues by using a subtree graph kernel (block 510) to produce a kernel matrix containing the similarity/distance between each join plan graph in the training set (block 512). The kernel matrix contains the similarity of each graph in the training set (block 508) with each respective graph in the training set.

For example, assume the training set contains N graphs. The kernel matrix (K) has N*N dimensions, where each entry denotes a similarity value. As such, K[0][1] denotes the similarity of graph-0 with graph-1, K[0][2] denotes the similarity of graph-0 with graph-2, and so on.

Note that creation of the kernel matrix may use a technique such as the Weisfeiler-Lehman kernel, through which the kernel matrix on all pairs of the N graphs described above having a runtime complexity of $O(Nhm+N^2hn)$, where N=total number of graphs, n=number of nodes in a graph, m=number of edges in a graph, h=number of iterations (max subtree height it is desired to compare). The Wesfeiler-Lehman kernel is described in Nino Shervashidze and Karsetn M. Borgwardt, "Fast subtree kernels on graphs" at 3.

The kernel matrix computation can be improved by enhancing the kernel algorithm. In one or more embodiments, the subtree kernel algorithm takes the maximum height (h) of a subtree as a parameter and checks for subtrees of height 1 to h to compute the feature vector. For finding similarity between two join plan graphs, a minimum height of 5 will be useful, so the kernel algorithm can be enhanced to start from a given minimum height.

The kernel matrix computation can also be enhanced by using the parallel processing capability described above in connection with FIG. 1

The process continues by submitting the subtree graph kernel matrix to a support vector machine (SVM), or another type of learning machine, for training (block 516) producing a trained SVM model, or another type of learning machine model, for cardinality prediction (block 516). The learning machine may have the capability to accept a subtree graph kernel matrix for an unknown query, described below, and, for example through a regression estimation, find the closest match to the subtree graph kernel matrix analyzed in the training process and use that match to estimate the cardinality, or a portion of the cardinality, of the unknown query. Conventional cardinality estimation techniques, using statistics, for example, may be used to estimate the cardinality of the portions of the join plan for the unknown query that cannot be reliably estimated by the learning machine.

The process ends (block 518).

A process for predicting cardinality for an unknown query, illustrated in FIG. 6, begins (block 602) with receipt of a join plan for the unknown query (block 604). The join plan is converted to a graph representation (block 606) to create a join plan graph of the unknown query (block 608). A kernel matrix is then created using a subtree graph kernel (block 610) to produce a kernel matrix containing a similarity/distance between join plan graphs of the unknown query with join plan graphs in the training set (block 612). The kernel matrix is of dimension 1*N, where N is the number of graphs in the training set. The kernel matrix also contains a similarity value of the join plan of the unknown query with each of the respective join plans in the training set. In one or more embodiments, the feature vectors for the training join plans created during the training phase illustrated in FIG. 5 are stored so they do not have to be regenerated during cardinality prediction for the unknown query.

The subtree graph kernel matrix of the unknown query is then input to the trained SVM model for cardinality prediction (block 614) to produce a predicted cardinality of the unknown query (block 616). The SVM model does not insist on an exact match for the subgraphs in the unknown query. Rather, the SVM model finds the similarity of the unknown query's join plan subgraphs with graphs or subgraphs in the training set and, where the similarity is sufficient (e.g., greater than a threshold value), uses the cardinality found in the training set to estimate the cardinality for the corresponding graph or subgraph.

The process ends (block 618).

The technique described herein was tested. A total of 500 queries were executed. The queries were of the below format. Each query contained 2 joins, so there were 1000 joins with a 1000 join plan graphs generated. Out of these 1000 join plan graphs, 50 joins were used as for testing.
   select count(1) as train_1
     from test.t10k_b,test.t1m_b,test.t100k_b
     where test.t10k_b.I2=test.t1m_b.I3 and
     test.t1m_b.I3=test.t100k_b.I2 and
     test.t10k_b.I3>1097952;
   Join columns, single table conditions and constants were generated randomly for the query templates. Three tables were used: t0k_b, t100k_b and t1m_b having 10 thousand rows, 100 thousand rows and 1 million rows, respectively. The 12 and 13 column of each table were skewed with 1000 unique values distributed over 70% rows, using different distribution. Statistics were collected for each single column as well as multicolumn for each table.

Figure 20:
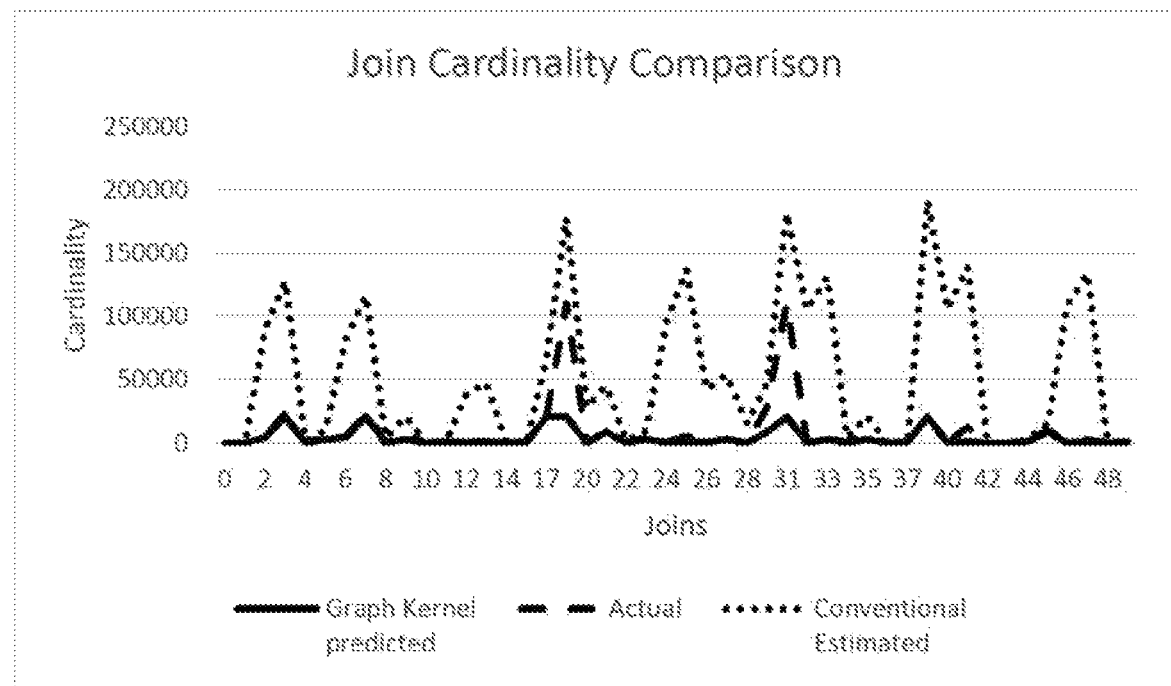
FIG. 20 is a line chart showing a comparison of a conventional cardinality estimation, a graph kernel prediction of cardinality, and actual cardinality.
Figure 21:
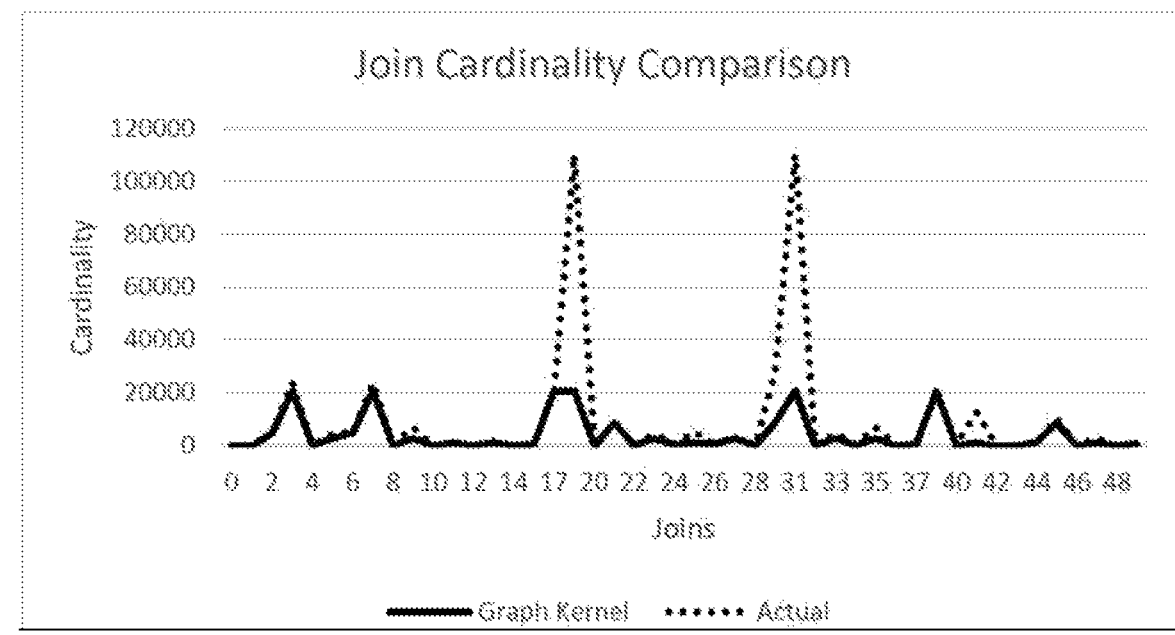
FIG. 21 is a line chart showing a comparison of a graph kernel prediction of cardinality and actual cardinality.

FIG. 20 is a line chart showing a comparison of a conventional cardinality estimation, a graph kernel prediction of cardinality, and actual cardinality. The X-axis plots the join id's for the 50 joins and the Y-axis is the cardinality estimate. FIG. 21 is similar to FIG. 20 except the conventional cardinality estimation is not included. In preparing FIGS. 20 and 21, some outlying data from the test was deleted.

As can be seen, except for join id's 19, 31, and 41, where the graph kernel underestimates cardinality, the graph kernel estimate follows the actual cardinality. In one or more embodiments, the graph kernel is tweaked to be conservative and avoid the underestimations.

The technique described herein is generic and can be applied to other aspects of database operation as well. The technique described herein represents structure in a structural/hierarchical format in graphs, calculates the similarity between the graphs, applies the kernel trick of machine learning algorithms, and predicts the target variable.

The "kernel trick" involves expressing the similarity between two graphs as a dot product of vectors representing the two graphs; i.e., if x1 and x2 are the n-dimensional graphs, the dot product is $x_1 \cdot x_2 = \Sigma_{i=1}^{n}[x_1]_i[x_2]_i$, where $[x]_i$ is the ith entry of the respective vector. A variation of the kernel trick, to be used when the vectors are not numerical in value, as is the case with the XML-like representation of graph structure described above, is to apply an inner product of the form $k(u, v) = <\varphi(u), \varphi(v)>$ in an embedding feature space determined by the map $\varphi$, which need not be given explicitly, as described above.

This disclosure is concerned with representing a join plan as a graph and predicting join cardinalities as target variables. One benefit of working with the query plans or join plans generated by the parsing engine module 108 instead of working on the SQL query itself is the technique is not concerned with partial ordering of the tables. The parsing engine module 108 has decided which is the best ordering to do the joins for a query.

The technique can be applied to other database problems. For example, the technique may be applied to predict performance parameters. If the entire query is analyzed, and not just the joins as described above, a complete query plan can be represented as graphs and a similarity matrix among query plans can be created using all of the performance parameters, including input/output (I/O) performance, central processing unit (CPU) performance, memory load, etc. as target variables to predict resource usage for the unknown query.

The technique may be used to capture query plans, create a similarity matrix, and apply a classification machine learning algorithm instead of regression to classify all of the queries based on un time to allow scheduling long running queries in a workload.

One aspect of the cardinality estimation technique described above is that rather than collecting statistics of remote tables, the technique is useful to predict cardinality based on previously performed joins. This is helpful when remote tables exist on a separate database server on a network because, for example, it reduces the data movement over the network.

The technique can also be used to estimate the complete query size of parametric queries. Parametric queries only differ in the constants/parameters. Other information like join tables, columns everything remain same. For example, queries coming from a website for login verification are similar to each other; the username and password changes. So, for these type of queries, query plans are almost similar and the technique can be used to predict size of the complete query.

Further examples consistent with the present disclosure are set out in the following numbered clauses.

Clause 1 A method for estimating a cardinality of a query, the method comprising:
- creating a join plan for the query;
- converting the join plan to a graph representation;
- generating a subtree graph kernel matrix for the graph representation of the join plan; and
- submitting the subtree graph kernel matrix to a trained model for cardinality prediction which produces a predicted cardinality of the query.

Clause 2 The method of clause 1 wherein the trained model is a support vector machine ("SVM").

Clause 3 The method of any of clauses 1 or 2 further comprising training the trained model for cardinality prediction.

Clause 4 The method of any of clauses 1, 2 or 3 wherein training the trained model for cardinality prediction comprises:
- receiving training join plans and training cardinalities for a plurality of training queries;
- converting the training join plans to respective training graph representations;
- generating a training subtree graph kernel matrix for the respective training graph representations; and
- submitting the training subtree graph kernel matrix and the respective training cardinalities to the model for cardinality prediction to produce a trained model for cardinality predication.

Clause 5 The method of any of clauses 1-4 wherein generating the training subtree graph kernel matrix for the respective training graph representations comprises performing dot products of the training graph representations with each other.

Clause 6 The method of any of clauses 1-5 wherein generating a subtree graph kernel matrix for the graph representation of the join plan comprises performing dot products of the graph representation of the join plan with the training graph representations.

Clause 7 The method of any of clauses 1-6 wherein the query comprises a single table predicate and a join predicate and converting the join plan to a graph representation comprises:
- representing a single table predicate as a first vertex in the graph representation, and
- representing the join predicate as a second vertex in the graph representation.

Clause 8 The method of any of clauses 1-7 wherein generating a subtree graph kernel matrix for the graph representation of the join plan using the identified subtrees comprises:
- identifying subtrees in the graph representation of the join plan.

Clause 9 The method of any of clauses 1-8 further comprising the trained model for cardinality prediction:
- matching a subtree from the identified subtrees in the graph representation of the join plan to a trained subtree and respective cardinality upon which the trained model for cardinality prediction had previously been trained and using the cardinality for the trained subtree in predicting the cardinality of the query.

Clause 10 The method of any of clauses 1-9 wherein matching comprises using a kernel method to find a similarity between the subtree from the identified subtrees in the graph representation of the join plan and the trained subtree.

Clause 11 A computer program, stored in a non-transitory computer-readable tangible medium, on which is recorded a computer program, the computer program comprising executable instructions, that, when executed, perform a method of estimating a cardinality of a query, comprising:
- creating a join plan for the query;
- converting the join plan to a graph representation;
- generating a subtree graph kernel matrix for the graph representation of the join plan; and
- submitting the subtree graph kernel matrix to a trained model for cardinality prediction which produces a predicted cardinality of the query.

Clause 12 The computer program of clause 11 wherein the trained model is a support vector machine ("SVM").

Clause 13 The computer program of any of clauses 11 and 12 wherein the method further comprises training the trained model for cardinality prediction.

Clause 14 The computer program of any of clauses 11-13 wherein training the trained model for cardinality prediction comprises:
- receiving training join plans and training cardinalities for a plurality of training queries;
- converting the training join plans to respective training graph representations;
- generating a training subtree graph kernel matrix for the respective training graph representations; and
- submitting the training subtree graph kernel matrix and the respective training cardinalities to the model for cardinality prediction to produce a trained model for cardinality predication.

Clause 15 The computer program of any of clauses 11-14 wherein generating the training subtree graph kernel matrix for the respective training graph representations comprises performing dot products of the training graphic representations with each other.

Clause 16 The computer program of any of clauses 11-15 wherein generating a subtree graph kernel matrix for the graph representation of the join plan comprises performing dot products of the graph representation of the join plan with the training graph representations.

Clause 17 The computer program of any of clauses 11-16 wherein the query comprises a single table predicate and a join predicate and converting the join plan to a graph representation comprises:
- representing a single table predicate as a first vertex in the graph representation, and
- representing the join predicate as a second vertex in the graph representation.

Clause 18 The computer program of any of clauses 11-17 wherein generating a subtree graph kernel matrix for the graph representation of the join plan using the identified subtrees comprises:
- identifying subtrees in the graph representation of the join plan.

Clause 19 The computer program of any of clauses 11-18 further comprising the trained model for cardinality prediction:
- matching a subtree from the identified subtrees in the graph representation of the join plan to a trained subtree and respective cardinality upon which the trained model for cardinality prediction had previously been trained and using the cardinality for the trained subtree in predicting the cardinality of the query.

Clause 20 The computer program of any of clauses 11-20 wherein matching comprises using a kernel method to find a similarity between the subtree from the identified subtrees in the graph representation of the join plan and the trained subtree.

The operations of the flow diagrams are described with references to the systems/apparatus shown in the block diagrams. However, it should be understood that the operations of the flow diagrams could be performed by embodiments of systems and apparatus other than those discussed with reference to the block diagrams, and embodiments discussed with reference to the systems/apparatus could perform operations different than those discussed with reference to the flow diagrams.

The word "coupled" herein means a direct connection or an indirect connection.

The text above describes one or more specific embodiments of a broader invention. The invention also is carried out in a variety of alternate embodiments and thus is not limited to those described here. The foregoing description of an embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for estimating a cardinality of a query, the query including a query predicate, the method comprising:
    creating a join plan for the query;
    creating a join plan graph for the join plan, wherein the join plan graph comprises a plurality of vertices, one of the plurality of vertices, a predicate vertex, representing the query predicate, the predicate vertex having an attribute;
    identifying a subtree graph as fewer than all of the plurality of vertices in the join plan graph, the subtree graph including the predicate vertex;
    hashing the attribute of the predicate vertex to provide a hashed identifier for the predicate vertex in the subtree graph;
    generating a subtree graph kernel matrix for the subtree graph, wherein the subtree graph kernel matrix comprises respective similarity values representing the similarity between the hashed identifier for the predicate vertex in the subtree graph and hashed attributes of the respective training join plan graphs for a plurality of training queries used to train a trained model for cardinality predication; and
    submitting the subtree graph kernel matrix to the trained model for cardinality prediction which produces a predicted cardinality of the query.

2. The method of claim 1 wherein the trained model is a support vector machine ("SVM").

3. The method of claim 1 further comprising training the trained model for cardinality prediction.

4. The method of claim 3 wherein training the trained model for cardinality prediction comprises:
    receiving training join plans and respective training cardinalities for a plurality of training queries;
    converting the training join plans to respective training join plan graph representations;
    generating a training subtree graph kernel matrix for the respective training join plan graph representations; and
    submitting the training subtree graph kernel matrix and the respective training cardinalities to the model for cardinality prediction to produce the trained model for cardinality predication.

5. The method of claim 4 wherein generating the training subtree graph kernel matrix for the respective training graph representations comprises performing inner products of the training join plan graph representations with each other.

6. The method of claim 1 wherein submitting the subtree graph kernel matrix to the trained model for cardinality prediction which produces a predicted cardinality of the query comprises:
    matching the subtree graph to a trained subtree and respective cardinality upon which the trained model for cardinality prediction had previously been trained and using the cardinality for the trained subtree in predicting the cardinality of the query.

7. The method of claim 6 wherein matching comprises using a kernel method to find a similarity between the subtree graph and the trained subtree.

8. A computer program, stored in a non-transitory computer-readable tangible medium, on which is recorded a computer program, the computer program comprising executable instructions, that, when executed, perform a method of estimating a cardinality of a query, the query including a query predicate, comprising:
    creating a join plan for the query;
    creating a join plan graph for the join plan, wherein the join plan graph comprises a plurality of vertices, one of the plurality of vertices, a predicate vertex, representing the query predicate, the predicate vertex having an attribute;
    identifying a subtree graph as fewer than all of the plurality of vertices in the join plan graph, the subtree graph including the predicate vertex;
    hashing the attribute of the predicate vertex to provide a hashed identifier for the predicate vertex in the subtree graph;
    generating a subtree graph kernel matrix for the subtree graph, wherein the subtree graph kernel matrix comprises respective similarity values representing the similarity between the hashed identifier for the predicate vertex in the subtree graph and hashed attributes of the respective training join plan graphs for a plurality of training queries used to train a trained model for cardinality predication; and
    submitting the subtree graph kernel matrix to the trained model for cardinality prediction which produces a predicted cardinality of the query.

9. The computer program of claim 8 wherein the trained model is a support vector machine ("SVM").

10. The computer program of claim 8 wherein the method further comprises training the trained model for cardinality prediction.

11. The computer program of claim 10 wherein training the trained model for cardinality prediction comprises:
    receiving the training join plans and respective training cardinalities for a plurality of training queries;
    converting the training join plans to respective training join plan graph representations;
    generating a training subtree graph kernel matrix for the respective training join plan graph representations; and submitting the training subtree graph kernel matrix and the respective training cardinalities to the model for cardinality prediction to produce the trained model for cardinality predication.

12. The computer program of claim 11 wherein generating the training subtree graph kernel matrix for the respective training graph representations comprises performing inner products of the training join plan graph representations with each other.

13. The computer program of claim 8 wherein submitting the subtree graph kernel matrix to the trained model for cardinality prediction which produces a predicted cardinality of the query comprises:

matching the subtree graph to a trained subtree and respective cardinality upon which the trained model for cardinality prediction had previously been trained and using the cardinality for the trained subtree in predicting the cardinality of the query.

14. The computer program of claim 13 wherein matching comprises using a kernel method to find a similarity between the subtree graph and the trained subtree.

* * * * *